(12) United States Patent
Woodall

(10) Patent No.: US 10,299,491 B2
(45) Date of Patent: May 28, 2019

(54) BEVERAGE

(71) Applicant: Guy Woodall, Leatherhead (GB)

(72) Inventor: Guy Woodall, Leatherhead (GB)

( * ) Notice: Subject to any disclaimer, the term of this patent is extended or adjusted under 35 U.S.C. 154(b) by 0 days.

(21) Appl. No.: 15/518,020

(22) PCT Filed: Oct. 9, 2015

(86) PCT No.: PCT/GB2015/052955
§ 371 (c)(1),
(2) Date: Apr. 10, 2017

(87) PCT Pub. No.: WO2016/055799
PCT Pub. Date: Apr. 14, 2016

(65) Prior Publication Data
US 2017/0245516 A1    Aug. 31, 2017

(30) Foreign Application Priority Data

Oct. 10, 2014   (GB) .................................. 1417947.7

(51) Int. Cl.
*A23F 3/16*       (2006.01)
*A23L 2/72*       (2006.01)

(52) U.S. Cl.
CPC ................ *A23F 3/163* (2013.01); *A23L 2/72* (2013.01); *A23V 2002/00* (2013.01)

(58) Field of Classification Search
CPC ................ A61K 36/82; A23V 2002/00; A23V 2250/214; A23V 2250/032; A23V 2250/2116; A23V 2250/21; A23F 3/18; A23F 3/14; A23F 3/30; A23F 3/405; A23F 3/16; A23F 3/366; A23F 3/40; A23L 2/60
See application file for complete search history.

(56) References Cited

U.S. PATENT DOCUMENTS

| | | | |
|---|---|---|---|
| 1,854,062 A | 4/1932 | Potter et al. | |
| 2,785,979 A | 3/1957 | Mitchell | |
| 4,539,216 A * | 9/1985 | Tse .......................... | A23F 3/163 |
| | | | 426/597 |
| 2009/0162523 A1 | 6/2009 | Geng | |

FOREIGN PATENT DOCUMENTS

| | | | | |
|---|---|---|---|---|
| CN | 101273744 A | 10/2008 | | |
| EP | 0162526 A3 | 11/1985 | | |
| GB | 1500067 | 2/1978 | | |
| HU | T47809 A * | 4/1989 | ............... | A23F 3/00 |
| HU | 203029 * | 5/1991 | ............... | A23F 3/00 |
| KR | 20100026050 A * | 3/2010 | ............... | A23L 1/09 |

(Continued)

OTHER PUBLICATIONS

HU-T47809-A, Abstract, Apr. 1989.*

(Continued)

*Primary Examiner* — Hong T Yoo
(74) *Attorney, Agent, or Firm* — Fish IP Law, LLP

(57) ABSTRACT

A method of producing tea syrup comprises contacting a plant material and/or plant extract with hot water to produce a tea. The method comprises filtering the tea to produce a tea filtrate, adding sugar to the tea filtrate, and then reducing the pH of either the tea or the tea filtrate, and thereby producing a tea syrup.

15 Claims, 1 Drawing Sheet

(56) References Cited

FOREIGN PATENT DOCUMENTS

WO           95/18540 A1    7/1995
WO    2015/022123 A1    2/2015

OTHER PUBLICATIONS

HU 203029 A, Mesaros Benoene, Molnar Sandor, Kali Gyoergyne, Hornyak Istvan and Barati Peter; Machine Translation, May 28, 1991. (Year: 1991).*
HU 203029 A, Mesaros Benoene, Molnar Sandor, Kali Gyoergyne, Hornyak Istvan and Barati Peter; May 28, 1991 (Year: 1991).*
KR 20100026050, Cho Y, Jeong S and Jung So Am, Machine Translation, Mar. 2010 (Year: 2010).*
"Ice Tea Syrup", Cooks.com, http://www.cooks.com/recipe/cf9I07on/ice-tea-syrup.html, screen capture Mar. 2015.

\* cited by examiner

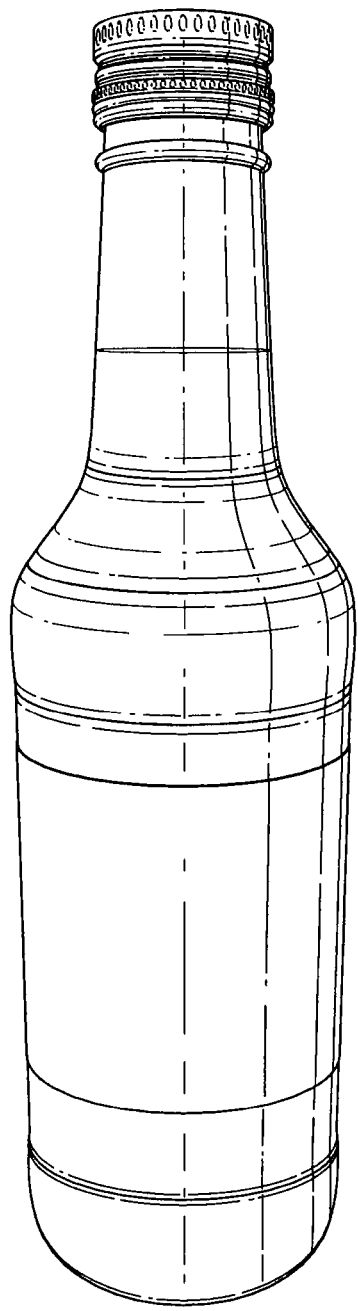

BEVERAGE

The present invention relates to beverages. More specifically, the present invention relates to methods for producing beverages, such as iced beverages. The invention is especially concerned with methods for producing syrups or concentrates of iced tea, or the like.

Commercially available ready to drink (RTD) iced teas are naturally unstable and have to be protected from both microbial activity, which can cause off flavours or exploding bottles, and physiological changes that can lead to flocculations and deposits. The industry response to microbial problems is to pasteurise or to use preservatives, but neither process is effective in a low acid environment which food scientists generally define as above pH 4.2, and commercial RTD iced teas are acidified by adding citric acid usually to a pH of about 3.5 so that they may be microbiologically stabilised.

There are many physical changes that can occur in tea and the two most common are flocculations, which are caused by reactions between components in tea and calcium in the water, and "tea cream" where on cooling tea, especially strong tea, develops a milky cloud and then over time separates into two fractions one of which drops out as a deposit. If calcium is a problem, deionised water may be used, and tea cream is avoided by using tea preparations, such as powdered instant tea or concentrated tea extract that have been processed to reduce the offending fractions, and by using relatively low quantities of these.

However, a problem is that all of the above are detrimental to the taste of the tea. Acidity tends to counteract the astringency of the tea as well as lightening its colour, and all the processes that counteract tea cream also remove important flavour compounds that reside in the deposit that is removed. The result is that iced tea as prepared commercially in ready to drink format has very little, if any, tea flavour, and as such is not saleable. The solution adopted by the industry has been to add other flavours not normally associated with tea, such as Peach, Mango and Lemon. RTD iced teas without added flavours have become vanishingly rare in commerce for these technical reasons.

There is therefore a need to provide improved methods for producing better tasting ready to drink ice tea.

According to a first aspect of the invention, there is provided a method of producing tea syrup, the method comprising:
  contacting a plant material and/or plant extract with hot water to produce a tea, wherein the concentration of the plant material and/or plant extract in the hot water is at least 50 grams per liter;
  filtering the tea to produce a tea filtrate;
  adding sugar to the tea filtrate; and
  reducing the pH of either the tea or the tea filtrate, and thereby producing a tea syrup.

Preferably, the tea syrup is an iced tea syrup.

Advantageously, the method of the invention provides a novel and elegant solution to the difficulties associated with preserving iced tea, and does so in a way that gives specific benefits to the consumer. These include a greatly improved taste (i.e. low acid), and so the tea does not need to be supplemented with additional flavours. The tea has much lower sugar concentrations, is good for hydration and has no need for preservatives.

Preferably, the concentration of plant material and/or plant extract in the hot water is at least 100 grams per liter, more preferably at least 150 grams per liter, even more preferably 200 grams per liter, and most preferably at least 250 grams per liter. In a preferred embodiment, the concentration of the plant material and/or plant extract in the hot water is about 200 to 250 grams per liter.

It will be appreciated that the plant material and/or plant extract could be collected from one or more plant species.

The plant material may comprise a leaf, stem, fruit, root and/or flower. Examples of suitable plant materials may include Elderflower petals, jasmine flowers, fresh nettles, rose hips, chamomile flowers, mint leaves, ginger and/or tea leaves and/or tea buds which may include gunpowder tea leaves, green tea leaves, black tea leaves, Sri Lankan tea leaves.

A plant extract may comprise essential oil obtained from the plant. The essential oil may be obtained from the flower, fruit, roots, leaves and/or stem of the plant. The essential oil may be obtained by expression, absorption, maceration and/or distillation. Examples of suitable plant extracts may include extracts from flowers, spices, nuts, herbs and/or fruits. Suitable plant extracts may comprise mint extract, peppermint extract, almond extract, bergamot extract, cinnamon extract, cloves extract, ginger extract, lemon extract, pistachio extract, rose extract, spearmint extract, vanilla extract, violet extract and/or wintergreen extract.

Preferably, the hot water contacted with the plant material and/or plant extract is at least 50° C., more preferably at least 60° C., and most preferably at least 70° C. or 80° C.

Preferably, the tea is filtered while the tea is still warm. It may be understood that the tea is considered to be warm when it is at least 30° C., 40° C., 50° C., 60° C., 70° C., 80° C. or 90° C.

The step of filtering the tea may comprise straining the tea and/or coarse-filtering the tea. Preferably, the step of filtering the tea comprises straining the tea and coarse-filtering the tea.

Preferably, sugar is added to the tea filtrate in the proportion of at least 1:1 sugar to tea filtrate. More preferably, sugar is added to the tea filtrate in the proportion of at least 1.5:1 or 2:1 sugar to tea filtrate. In a preferred embodiment sugar is added to the tea filtrate in the proportion of about 2:1 sugar to tea filtrate. It will be appreciated that these ratios are calculated using the relative weights of the sugar and tea filtrate.

Preferably, the step of reducing the pH is carried out after the filtration step. Preferably, the pH of the tea filtrate is reduced by contacting the filtrate with an acid. It will be understood that any suitable food grade acid may be used, such as citric acid, malic acid, tartaric acid, ascorbic acid or phosphoric acid. Citric acid however is preferred.

Preferably, the pH of the tea syrup is reduced to a pH of below 4.5, more preferably below 4.2 and most preferably below 4.0. Preferably, the pH of the tea syrup is reduced to a pH which is above 2.8 or above, more preferably above 3.0 or above, and even more preferably 3.5 or above. Preferably, the pH of the tea syrup is reduced to a pH between 2.8 and 4.5, more preferably between 3.0 and 4.2.

In one preferred embodiment, the pH of the tea syrup is reduced to a pH between 3.5 and 4.0. Preferably, the pH of the tea syrup is reduced to about 3.6.

In an alternative preferred embodiment, the pH of the tea syrup is reduced to a pH between 2.8 and 4.0. Preferably, the pH of the tea syrup is reduced to about 3.0.

It will be appreciated that Degrees Brix (° Bx) is the sugar content of an aqueous solution. One degree Brix equates to 1 g sucrose in 100 g of solution, and represents the strength of the solution as a percentage of mass. If the solution contains any dissolved solids other than pure sucrose, then the ° Bx only approximates the dissolved solid content.

Preferably, therefore, the tea syrup produced by the method of the invention has a Brix value of at least 50° Bx, and more preferably at least 60° Bx or 70° Bx. In a preferred embodiment, the tea syrup has a Brix value of about 67° Bx.

The skilled person will appreciate that the water activity or "$a_w$" is the partial vapour pressure of water in a substance divided by the standard state partial vapour pressure of water. The standard state is usually defined as the partial vapour pressure of pure water at the same temperature. Preferably, the water activity of the tea syrup produced by the method of the invention is less than 0.90, and more preferably less than 0.85.

Preferably, the method comprises filling a container with the tea syrup for storage. Preferably, the container is a bottle. Preferably, the tea syrup is heated to at least 100° C. before filling. Preferably, once the tea syrup has been heated to at least 100° C., it is inserted into the container before the temperature of the syrup drops below 70° C., and more preferably before the temperature has dropped below 75° C., 80° C. or 85° C.

As explained above, the tea syrup undergoes a heat treatment prior to filling. The reason for this is to kill any mould spores present in the tea syrup. However, it will be understood that preservatives could be added instead of, or in conjunction with, a heat treatment. The preservatives would also kill any mould spores present in the tea syrup.

Preferably, the method comprises diluting the tea syrup with water prior to consumption in order to produce iced tea. Advantageously, the iced tea tastes of tea and does not need supplementing with additional flavours. The method of the invention is convenient because a user simply dilutes the tea syrup with water, and then drinks the resultant diluted tea mixture, rather than having to brew hot tea which then needs to be chilled before consumption.

Preferably, the ratio of water to tea syrup in the iced tea is at least 12:1, and more preferably at least 15:1. More preferably, the ratio of water to tea syrup in the iced tea is at least 17:1, even more preferably at least 20:1, and still more preferably at least 22:1, and most preferably at least 25:1. Preferably, the ratio of water to tea syrup is between 20:1 and 25:1.

It will be understood that the pH of the tea syrup is raised due to the dilution step with water. Preferably, the pH of the diluted iced tea is above 4.0, more preferably above 5.0. Preferably, the pH of the diluted iced tea is in the range of 4 to 7, more preferably in the range of 4.2 to 6.5.

In one preferred embodiment, the pH of the diluted iced tea is in the range of 4.0 to 5.0, preferably 4.1 to 4.7, and more preferably 4.2 to 4.5.

In an alternative preferred embodiment, the pH of the diluted iced tea is in the range of 4.5 to 5.5, and preferably 4.7 to 5.3, and more preferably approximately 5.1.

In a further alternative preferred embodiment, the pH of the diluted iced tea is in the range of 5.0 to 7.0, and preferably 5.5 to 6.5, and more preferably approximately 6.0.

Preferably, the sugar concentration of the diluted iced tea is less than 6% (w/w), and more preferably less than 5% (w/w). Preferably, the sugar concentration of the diluted iced tea is about 3% (w/w) or 4% (w/w).

All features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying Figures, in which:

FIG. 1 is a picture showing a bottle of ice tea concentrate made using an embodiment of the method of the invention.

The inventor has developed a novel method for producing iced teas. The teas taste of tea and do not need supplementing with additional flavours, so that they taste like iced teas one might make at home, but with much more convenience as one simply mixes and drinks, rather than having to brew hot and then chill before consumption. The method is simple and relies on certain processes and parameters as follows:

Firstly, tea is brewed in the normal way, but much stronger than usual. Typically, 1 kg of tea to 4 liters hot water, so 250 g/l rather than the 5 g/l typical for iced tea, i.e. 50 times as strong. It will be appreciated that the length of time the tea brews for depends upon the temperature of the hot water. The inventor has found that the tea only needs to be brewed for about 5 minutes when the temperature of the water is approximately 80° C. but conversely the tea needs to be brewed for approximately 20 minutes when the temperature of the water is approximately 60° C. This tea is strained and coarse-filtered while still hot and before the tea cream forms on cooling. The inventor uses a diatomaceous earth filter to remove solids from the tea.

Sugar is then added in the proportion of 2:1 to the filtered tea, which will have begun to cream and separate, and this surprisingly reverses the tea cream and results in a clear, bright and stable syrup with no deposit. The tea cream problem is thus solved by the cream being reabsorbed into the tea. To ensure the correct quantity of sugar is added to the tea, the ratio is calculated by measuring the refraction index of the tea syrup as the sugar is added. The refraction index equates to the Brix (% soluble solids), and from this the ratio of sugar in the tea syrup can be calculated.

Citric acid is then added to reduce the pH to between 3.0 and 3.6. The Brix (% soluble solids) of the syrup is 67. This combination (or various permutations of it that can be calculated) ensures a water activity ($a_w$) of below 0.85, and this in turn ensures microbial stability at least for yeast and bacteria which cannot obtain the water they need to grow under such conditions. Mould spores remain a risk however and to ensure that these are also destroyed, the syrup is filled hot at a minimum of 72 degrees C. and typically 86 degrees C. having first been heated to a minimum of 100 degrees C. (the boiling point is about 105 degrees C.). For this process to be effective, the pH should be below about 4.5.

The tea syrups are then diluted 25:1, or in some cases 20:1, for consumption. The result is an iced tea with the following characteristics:

Firstly, the pH of the drink is raised by dilution. Where the tea is a traditional tea, such as Earl Grey or Moroccan Mint, the tea syrup will have a pH of about 3.6, which will result in the pH of the diluted tea being raised to about 6, which means that the acidity which had to be added to ensure the stability of the syrup is diluted below the taste threshold and the tea therefore tastes like freshly brewed home made tea which also has a pH just on the acid side of neutral. However, where the tea is a more acidic tea, such as Lemon Ceylon, the pH will be raised to about 5.1. This gives the tea a low but detectable acidity due to the lemon. Finally, where the tea is an even more acidic tea, such as Elderflower and Nettle, the tea syrup will have a pH of about 3.0, which will result in the pH of the diluted tea being raised to about 4.3 or 4.4.

Secondly, additional flavours not normally found in tea are not required or used, although flavours normally found in or infused with tea such as jasmine, bergamot (Earl Grey), mint or lemon may all be included.

Thirdly, the tea is bright and there are no flocculations or deposits.

Fourthly, the iced tea is low in sugar, about 3%, or 4% in some variants, compared to about 8-9% for currently available RTD iced teas. The relatively high sugar level in Liptons iced tea is a function of the high acidity, which needs to be balanced by high sugar levels in order to be palatable, whereas the tea produced using the method of the invention with its lower acidity is palatable with much less sugar. This means that in addition to tasting good, the teas are genuinely hydrating and thirst quenching, which is in contrast to any drink that is more than 6% sugar which is hypertonic meaning that it tends to dehydrate. Sports Drinks are usually isotonic (i.e. 6%) whereas the tea of the invention is unusual in being hypotonic, significantly below 6%, which means it is thirst quenching. This benefit also applies to herb tea variants like elderflower.

Elderflower iced tea concentrate is twice as strong as a typical elderflower cordial (20:1 dilution compared to 8-10:1 dilution) and has half the sugar, which is a big benefit for the consumer who wants good value, to reduce sugar intake, and to achieve good hydration. They key factor differentiating Elderflower Iced Tea Concentrate from Elderflower Cordial is much lower acidity, which means higher dilution rate and hence the need for increased elderflower flavour to compensate for the increased dilution rate.

SUMMARY

The inventor believes that the method of the invention is innovative for several reasons. Tea flavoured syrups are available from Liptons in certain markets as well as syrup producers such as Monin, and so it is not simply the concentrated format that is new. These, however, are much weaker and are intended typically for 6:1 dilution, and are usually lower Brix and therefore need to use preservatives but these may not be in significant levels to be declared on labels. Liptons tea syrup is a concentrated form of the ready to drink product and so is formulated to give the same acidity in the final drink and so proportionally more in the concentrate, and the opportunity to make a low acid iced tea is not taken. Monin syrups and other mainly French producers also aim to imitate existing commercial iced teas and not to improve on them and they do not take advantage of the potential benefits of the format, and indeed most likely are not aware of them (their basic process is to add commercially prepared flavour extracts to a standard base syrup). They have to use preservatives (although these are not declared on labels since they are diluted to insignificant levels for consumption) and do not take advantage of the potential for preserving the syrup by virtue of low water activity ($a_w$) and precautionary heat treatment. In summary, the process of the invention is innovative because it provides a novel solution to the difficulties of preserving iced tea, and does so in a way that gives specific benefits to the consumer such as greatly improved taste (i.e. low acid), much lower sugar concentration, good hydration, good value for money, no need for preservatives or other additives (including flavours), as well as environmental benefits compared to the shipping and packing waste generated by RTD iced teas.

What is claimed is:

1. A method of producing a tea syrup, the method comprising:
    contacting at least one of a plant material and a plant extract with water at a temperature of at least 60° C. to produce a tea, wherein a concentration of at least one of the plant material and the plant extract in the hot water is at least 50 grams per liter;
    filtering the tea to produce a tea filtrate, wherein the tea is at a temperature of at least 50° C. when it is filtered;
    adding sugar to the tea filtrate at a concentration sufficient to cause the filtrate to have a Brix value of at least 50° Bx and thereby causing tea cream to be reabsorbed into the tea filtrate; and
    reducing a pH of either the tea or the tea filtrate to between 2.8 and 4.5,
and thereby producing the tea syrup.

2. The method according to claim 1, wherein the concentration of the at least one of the plant material and the plant extract in the hot water is about 200 to 250 grams per liter.

3. The method according to claim 1, wherein the tea is filtered while the tea is still at a temperature of at least 60° C.

4. The method according to claim 1, wherein sugar is added to the tea filtrate in the proportion of about 2:1 by weight of sugar to tea filtrate.

5. The method according to claim 1, wherein the pH of the tea filtrate is reduced by contacting the filtrate with at least one of citric acid, malic acid, tartaric acid, ascorbic acid or phosphoric acid.

6. The method according to claim 1, wherein the sugar is added to the tea filtrate at the concentration sufficient to cause the filtrate to have the Brix value of between 60° Bx and 70° Bx.

7. The method according to claim 1, wherein the method comprises adding sugar to the tea filtrate at a concentration sufficient to cause the filtrate to have a Brix value of at least 60° Bx.

8. The method according to claim 1, wherein a water activity of the tea syrup is less than 0.90.

9. The method according to claim 1, wherein a water activity of the tea syrup is less than 0.85.

10. The method according to claim 1, further comprising heating the tea syrup to at least 100° C., and filling a container with the tea syrup for storage.

11. A method of producing iced tea, the method comprising the method of producing tea syrup according to claim 1, and further comprising diluting the tea syrup with water prior to consumption in order to produce iced tea, wherein a ratio of water to tea syrup in the iced tea is at least 12:1.

12. The method according to claim 11, wherein the ratio of water to tea syrup in the iced tea is between 20:1 and 25:1.

13. The method according to claim 11, wherein a pH of the iced tea is between 4.2 to 6.5.

14. The method according to claim 11, wherein a sugar concentration of the iced tea is less than 6% (w/w).

15. The method according to claim 1, wherein the method comprises contacting the plant material with water at the temperature of at least 60° C., and the plant material comprises at least one of elderflower petals, jasmine flowers, fresh nettles, rose hips, chamomile flowers, mint leaves, ginger, tea leaves and tea buds.

* * * * *